United States Patent
Okajima et al.

(12) 
(10) Patent No.: US 6,338,795 B1
(45) Date of Patent: Jan. 15, 2002

(54) PURIFYING SYSTEM

(75) Inventors: Susumu Okajima; Kazuyoshi Takei, both of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/481,694

(22) Filed: Jan. 12, 2000

(51) Int. Cl.[7] .......................... B01D 21/00; B01D 21/04; B01D 21/26; B01D 36/04; B23Q 11/00
(52) U.S. Cl. .................... 210/168; 210/187; 210/194; 210/195.1; 210/241.3; 210/295; 210/298; 210/320; 210/322; 210/512.1; 210/526
(58) Field of Search ................... 210/241.3, 295, 210/298, 194, 195.1, 168, 526, 187, 512.1, 322, 320

(56) References Cited

U.S. PATENT DOCUMENTS

| | | | |
|---|---|---|---|
| 3,456,798 A | * | 7/1969 | Urdanoff |
| 3,795,316 A | * | 3/1974 | Wood |
| 3,897,335 A | | 7/1975 | Brandt |
| 4,521,313 A | * | 6/1985 | Wolde-Michael |
| 4,551,246 A | | 11/1985 | Coffing |
| 4,751,006 A | * | 6/1988 | Becker |
| 5,244,573 A | | 9/1993 | Horisawa |
| 5,269,941 A | | 12/1993 | Chave et al. |
| 5,601,705 A | * | 2/1997 | Glasglow |

FOREIGN PATENT DOCUMENTS

| | | | |
|---|---|---|---|
| DE | 2213444 | * | 10/1973 |
| DE | 9403781 | | 8/1994 |
| JP | Sho.58-174211 | | 10/1983 |
| JP | Sho.59-39309 | | 3/1984 |
| JP | Hei.3-52609 | | 3/1991 |
| JP | Hei.3-294142 | | 12/1991 |
| JP | Hei.4-129643 | | 4/1992 |
| JP | Hei.4-193306 | | 7/1992 |
| JP | Hei.5-115857 | | 5/1993 |
| JP | Hei.5-161882 | | 6/1993 |

OTHER PUBLICATIONS

Patent Abstracts of Japan, vol. 008, No. 007 (C–204), Jan. 12, 1984 & JP 58174211 A (Toyoda Koki Kk; Others: 01), Oct. 13, 1983.
Patent Abstracts of Japan, vol. 014, No. 544 (C–0784), Dec. 4, 1990 & JP 02 233165 A (Taikisha Ltd.), Sep. 14, 1990.

* cited by examiner

Primary Examiner—Thomas M. Lithgow
(74) Attorney, Agent, or Firm—Smith, Gambrell & Russell LLP

(57) ABSTRACT

A second purifying apparatus 2 for furthermore purifying working solution purified by a first purifying apparatus 1 is disposed downstream of the first purifying apparatus 1. A working-solution introducing pipe 42 which is capable of diffusing and discharging the working solution from the lower end thereof is disposed in substantially the central portion of the working-solution accumulating tank 40 in which the working solution is accumulated. A filter 44 for vertically sectioning the working-solution accumulating tank 40 at an intermediate position is provided. A weir 45 is formed at an upper end of the working-solution accumulating tank 40. Moreover, a separating wall is formed along the inner wall of the weir 45. A solution gathering groove 47 is provided for the outer surface of the weir 45.

22 Claims, 6 Drawing Sheets

PURIFYING SYSTEM

BACKGROUND OF THE INVENTION

1. Field of the Invention

The present invention relates to a purifying system for removing impurities which are mixed in working solution used in a manufacturing process.

2. Description of the Related Art

The working solution for use in a manufacturing process includes, for example, cleaning solution for use in a cleaning operation or grinding fluid (a coolant) for use in a grinding operation. In general, the foregoing working solutions encounter mixture of a variety of impurities. Therefore, when the working solution is recycled, the working solution must be purified before recycling.

As a means for purifying the working solution, a variety of suggestions have been made. For example, a technique has been disclosed in Japanese Patent Laid-Open No. Sho.58-174211. According to the foregoing disclosure, impurities, such as powder mainly composed of magnetic substances and produced due to a cutting operation, are adsorbed to a magnet drum. Then, impurities adsorbed to the magnet drum are separated and removed by a scraper. Moreover, deposited non-magnetic impurities, such as abrasive grains, are scraped and removed by a scraper chain.

In Japanese Patent Laid-Open No. Sho.59-39309, a technique has been disclosed with which an ultrasonic vibrating plate is provided for the side wall of the tank. Ultrasonic waves oscillated from the ultrasonic vibrating plate are used to oscillate impurities mainly composed of oil components mixed and suspended in the working solution to coagulate and float the same. Then, floated impurities are removed by a skimmer.

Another technique has been disclosed in Japanese Patent Laid-Open No. Hei.4-129643. According to the foregoing disclosure, a lower portion of a rotative plate having a surface in which a plurality of grooves are spirally or concentrically formed is vertically and downwards immersed into the working solution accumulated in a tank. Then, the rotative plate is slowly rotated to cause impurities floating on the liquid level of the working solution and mainly composed of oil components to adhere to the surface of the rotative plate so as to separate the impurities of the foregoing type from the working solution. Then, impurities allowed to adhere to the surface of the rotative plate is scraped by a scraper so as to be gathered in a purify portion.

In Japanese Patent Laid-Open No. Hei.3-294142, a technique has been disclosed with which a filter incorporating a filter cloth is applied to the body of a rotative drum. Then, cutting oil allowed to pass through the filter cloth and introduced into the rotative drum is pumped out from a conduit to a recovery tank.

Although the purifying system adapted to any one of the foregoing purifying methods or arranged by combining the foregoing methods with one another permits a somewhat satisfactory purifying effect, fine impurities of a type mixed in the working solution cannot be removed.

It leads to a fact that the working solution purified by the conventional purifying system adapted to any one of the foregoing purifying method encounters easy deterioration in the working solution owing to corrosion of the fine residues. Therefore, elongation of the changing cycle is undesirably limited. Hence it follows that the running cost and the cost required to dispose the waste solution cannot be reduced.

SUMMARY OF THE INVENTION

In view of the foregoing, an object of the present invention is to provide a purifying system which is capable of significantly improving performance for purifying working solution, which permits the working solution to repeatedly be used for a long time and which is able to reduce the running cost and the cost required to dispose waste solution.

To solve the above-mentioned problems, a first purifying system according to the present invention is a purifying system disposed in a circulating circuit for working solution for use in a manufacturing process, the purifying system comprising: a first purifying apparatus for removing impurities mixed in the working solution; and a second purifying apparatus disposed downstream of the first purifying apparatus and structured to furthermore purify the working solution purified by the first purifying apparatus, wherein the second purifying apparatus incorporates a working-solution accumulating tank for accumulating the working solution; a filter for vertically sectioning the working-solution accumulating tank at an intermediate position of the working-solution accumulating tank; a working-solution introducing pipe disposed in substantially a central portion of the working-solution accumulating tank such that the working-solution introducing pipe penetrates the filter and structured to diffuse and discharge the working solution supplied from the first purifying apparatus from a lower end of the working-solution accumulating tank; a weir formed at an upper end of the working-solution accumulating tank; an oil separating wall formed along the inner wall of the weir and having a lower end which is lower than the weir; and a solution gathering groove formed in the outer surface of the weir.

A second purifying system according to the present invention has a structure according to the first purifying system, wherein the bottom of the working-solution accumulating tank is formed into an inclined surface downwards inclined toward the central portion thereof, and a drain valve is disposed which is capable of discharging impurities deposited at the lower end of the inclined surface.

A third purifying system according to the present invention has a structure according the first purifying system or the second purifying system, a centrifugal separator which is capable of purifying the working solution supplied from the first purifying apparatus is disposed between the first purifying apparatus and the second purifying apparatus, and the centrifugal separator supplies separated working solution containing impurities to the second purifying apparatus.

A fourth purifying system according to the present invention has a structure according to the third purifying system, wherein the centrifugal separator adjusts the flow rate of the working solution which is supplied from the first purifying apparatus to the second purifying apparatus.

A fifth purifying system according to the present invention has a structure according to any one of the first to the fourth purifying system, wherein the first purifying apparatus incorporates a first tank chamber, and a scraper conveyor which is capable of discharging deposited and suspended impurities to the outside of the first tank chamber is provided for the first tank chamber.

A sixth purifying system according to the present invention has a structure according to the fifth purifying system, wherein the scraper conveyor incorporates a conveyor body and a plurality of scrapers, and the scraper are joined to the conveyor body such that displacement of the scraper is permitted.

A seventh purifying system according to the present invention has a structure according to the fifth purifying system, wherein the first purifying apparatus incorporates a second tank chamber formed adjacent to the first tank chamber at a position downstream of the first tank chamber, and sucking means for sucking floating impurities to return sucked impurities to the first tank chamber is provided for the second tank chamber.

An eighth purifying system according to the present invention has a structure according to the seventh purifying system, wherein the second tank chamber incorporates heating means for heating the working solution.

A ninth purifying system according to the present invention has a structure according to the seventh purifying system or the eighth purifying system, wherein the second tank chamber incorporates circulating means for circulating the working solution in the second tank chamber and corner plates which form curved portions in the corners of the second tank chamber.

A tenth purifying system according to the present invention has a structure according to any one of the seventh purifying system to the ninth purifying system, wherein the second tank chamber has a recess in which impurities can be deposited and which is formed in substantially the central portion of the bottom of the second tank chamber and a drain valve disposed at a lower end of the recess.

DETAILED DESCRIPTION OF THE PREFERRED EMBODIMENT

Figure 1:
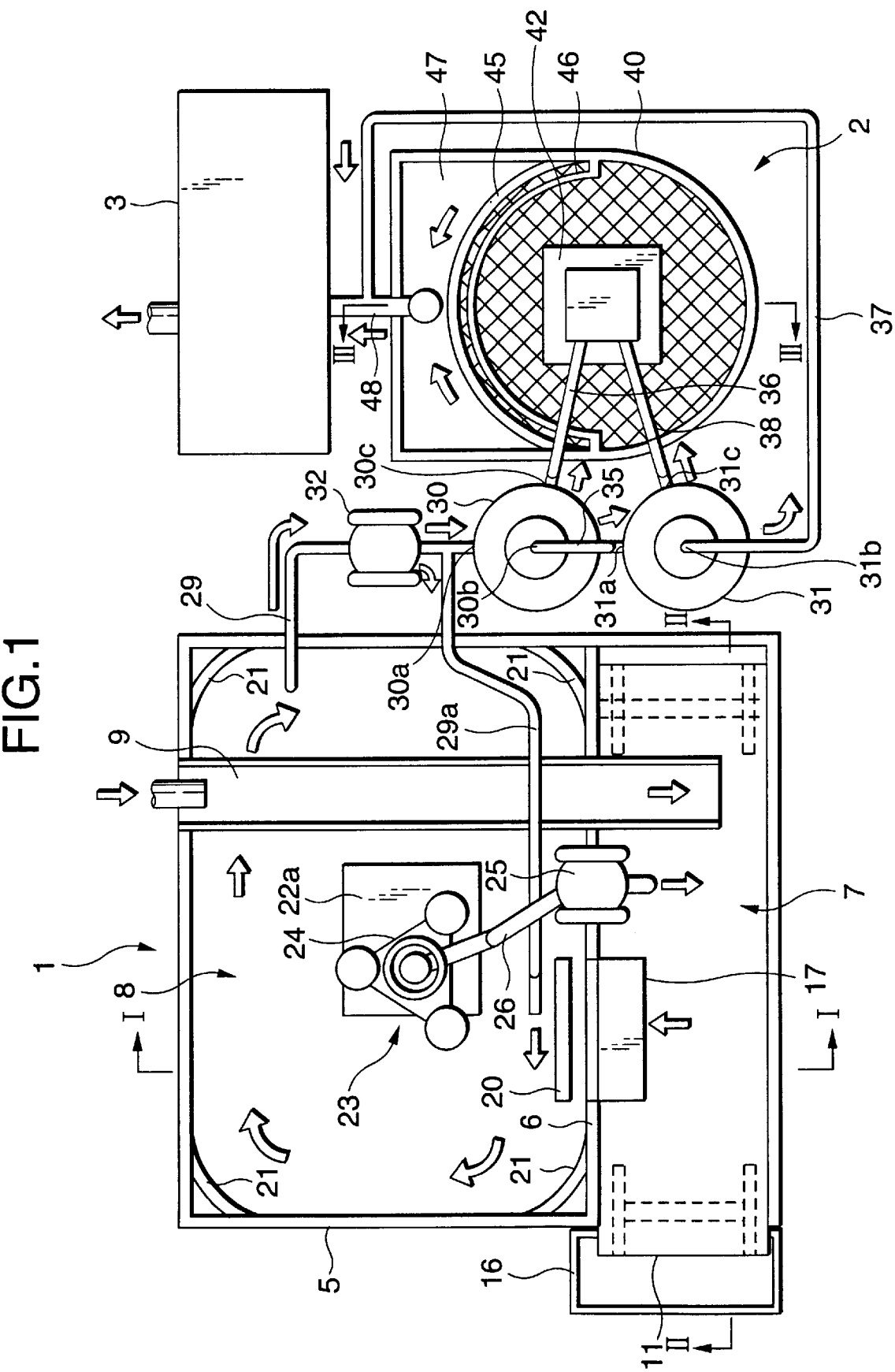
FIG. 1 is an upper view showing the schematic structure of a purifying system.

Referring to the drawings, an embodiment of the present invention will now be described.

FIGS. 1 to 9 show a purifying system for working solution (cleaning solution) for use in a cleaning machine for use in a cleaning process which is performed after a lapping operation has been performed by a compound lapping machine for finishing the tooth surfaces of a hypoid gear set.

As shown in FIG. 1, the purifying system according to the present invention incorporates a first purifying apparatus 1 for primarily purifying working solution which has been used in a cleaning machine (not shown); a second purifying apparatus 2 connected to the first purifying apparatus 1 at a position downstream of the first purifying apparatus 1 and secondary purifying working solution. Note that reference numeral 3 shown in FIG. 1 represents a clean tank for accumulating the working solution subjected to the purifying process performed by the purifying system.

The foregoing first purifying apparatus 1 incorporates a first working-solution accumulating tank 5 which is capable of accumulating the working solution.

The first working-solution accumulating tank 5 is formed into a box-like shape, the inside portion of which is sectioned into a first tank chamber 7 and a second tank chamber 8 by a partitioning plate 6.

The partitioning plate 6 has a communication port 6a formed at substantially the lengthwise-directional central portion of the partitioning plate 6, the position of the communication port 6a being adjacent to the liquid level of the working solution which is accumulated in the first working-solution accumulating tank 5. The communication port 6a is formed to establish the communication between the first tank chamber 7 and the second tank chamber 8 (refer to FIGS. 2 and 3).

A working-solution supply groove 9 is formed in the upper portion of the first working-solution accumulating tank 5. The downstream end of the working-solution supply groove 9 is allowed to face the first tank chamber 7. Thus, the working-solution supply groove 9 permits supply of the working solution used in the cleaning machine to the first tank chamber 7.

Legs 5a are formed at required positions of the bottom of the first working-solution accumulating tank 5. The legs 5a support the first working-solution accumulating tank 5 at a predetermined height from the installation floor (see FIGS. 2 and 3).

Figure 3:
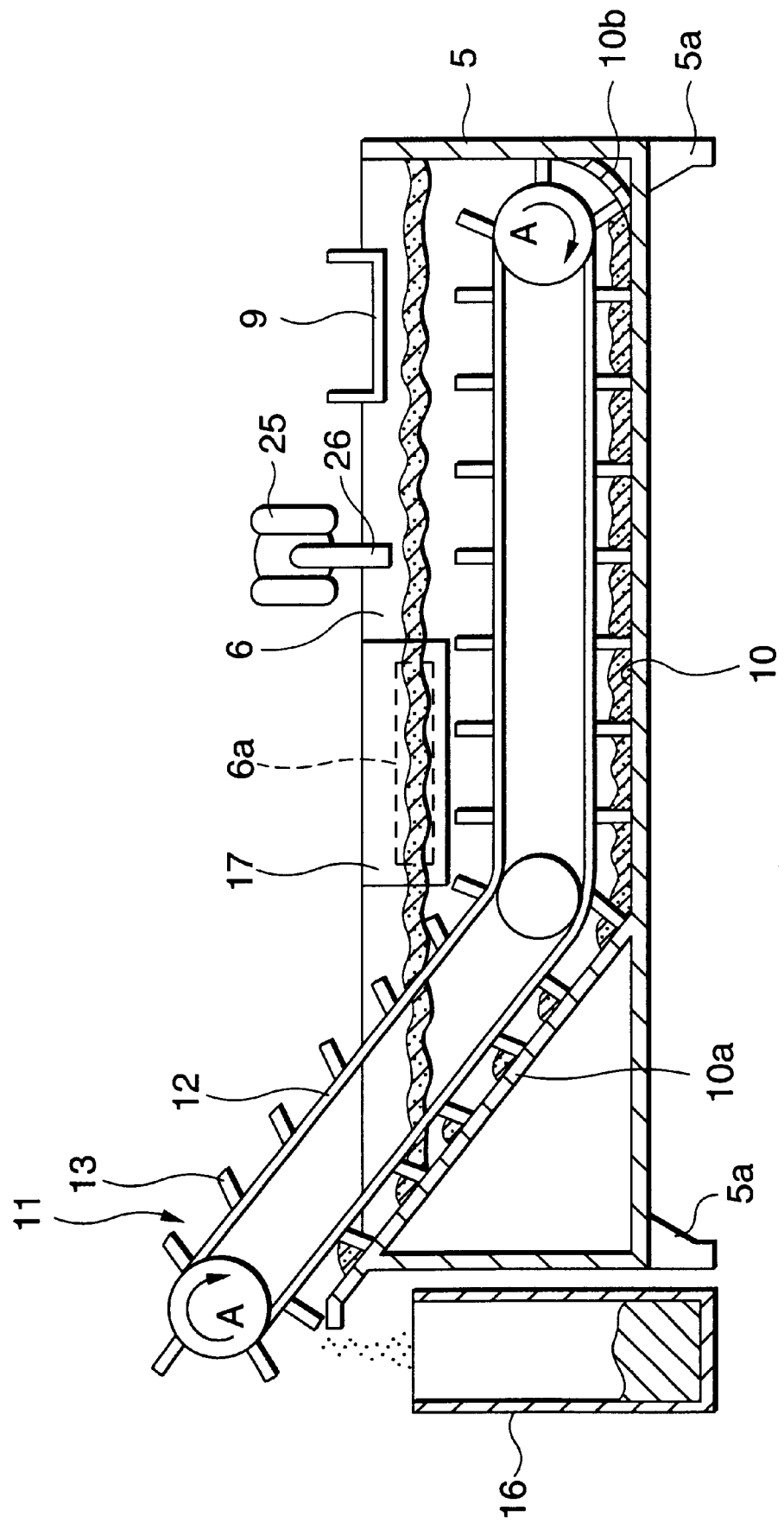
FIG. 3 is a cross sectional view taken along line II—II shown in FIG. 1.

As shown in FIG. 3, the first tank chamber 7 is provided with a scraper conveyor 11 for removing sludge deposited on the bottom surface 10 of the first tank chamber 7 and oil allowed to float on the liquid level of the working solution.

The scraper conveyor 11 is disposed slidably along the bottom surface 10 of the first tank chamber 7 and having an end at which the conveyor 11 is slidably joined to one of side walls of the first tank chamber 7. Another end of the scraper conveyor 11 projects the other side wall of the first tank chamber 7.

That is, in the bottom surface 10 of the first tank chamber 7, there is formed an inclined surface 10a upwards inclined from an intermediate position in the lengthwise direction to the other end. The other end of the scraper conveyor 11 is inclined along the inclined surface 10a to be allowed to project over the other end of the first tank chamber 7. A curved surface 10b is formed at the one end of the bottom surface 10 of the first tank chamber 7. Thus, the scraper conveyor 11 slides along the curved surface 10b at the one end thereof.

Figure 2:
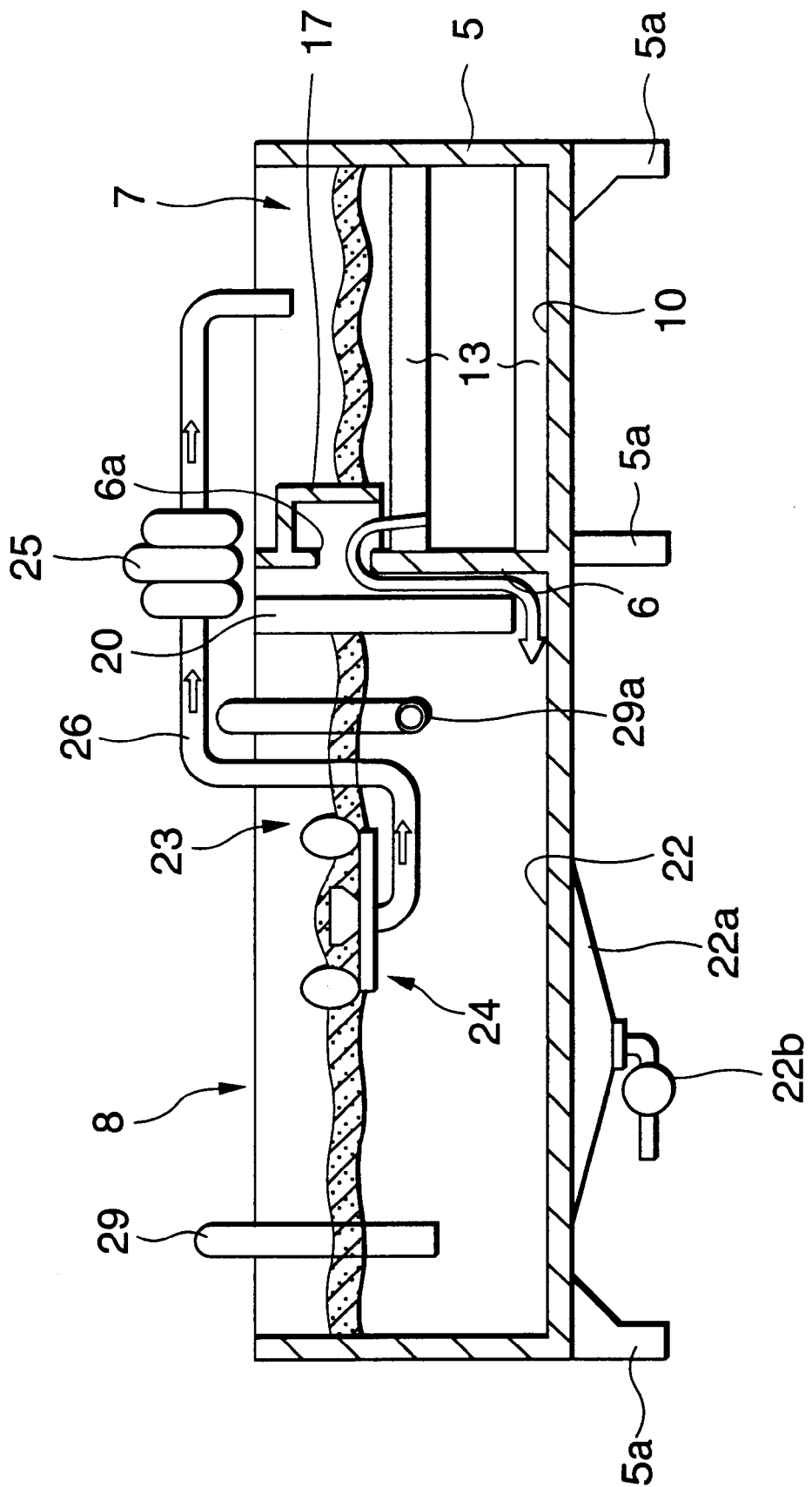
FIG. 2 is a cross sectional view taken along line I—I shown in FIG. 1.

The scraper conveyor 11 incorporates a conveyor body 12 and a plurality of scrapers 13 each of which is formed into a rectangular plate-like member having a length which is substantially the same as the width of the first tank chamber 7 (see FIG. 2). The scrapers 13 are disposed on the conveyor body 12.

Figure 4:
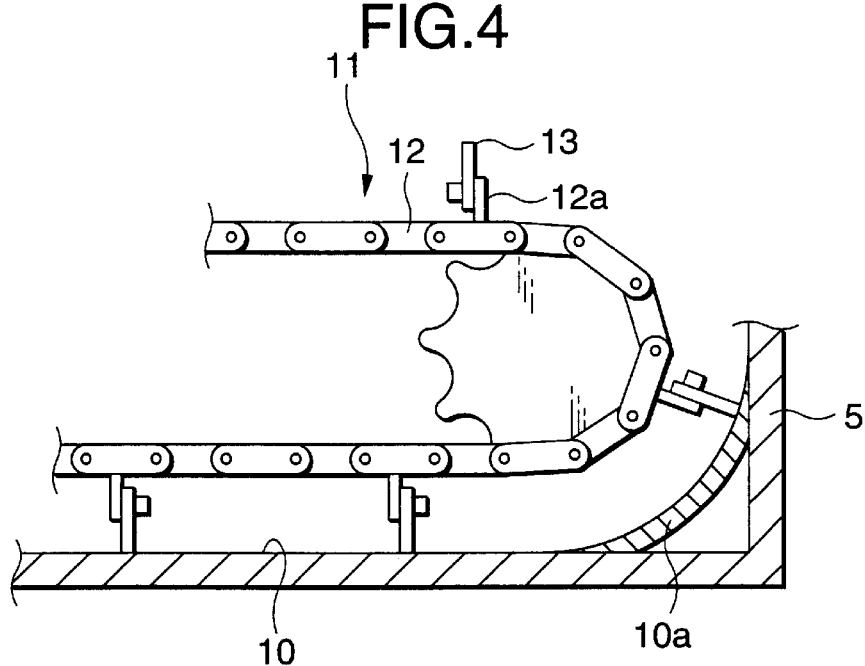
FIG. 4 is a cross sectional view showing an essential portion of a scraper conveyor.
Figure 5:
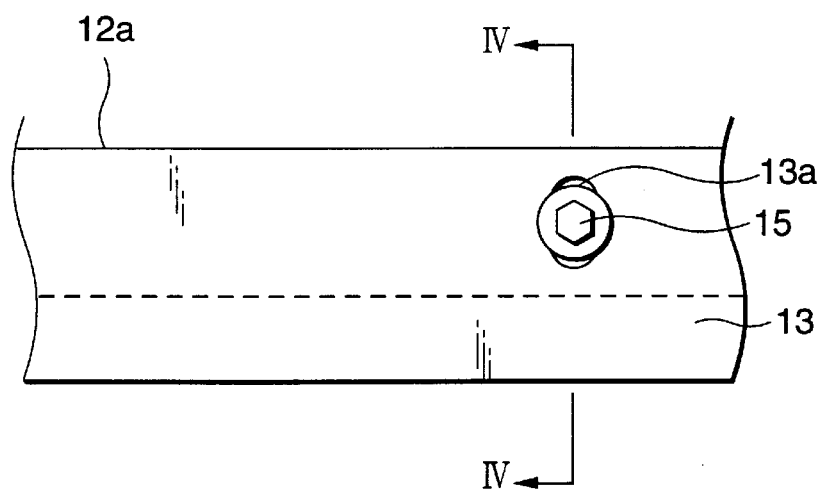
FIG. 5 is a front view showing an essential portion of a scraper.
Figure 6:
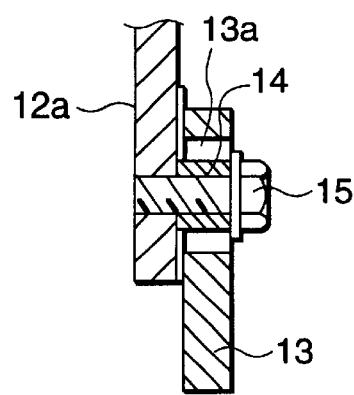
FIG. 6 is a cross sectional view taken along line IV—IV shown in FIG. 5.

Specifically, as shown in FIG. 4, joining plates 12a for attaching the scrapers 13 are provided for the conveyor body 12 at predetermined intervals. An elongated hole 13a is formed in the scrapers 13 (see FIG. 5). The scraper 13 is joined to the joining plate 12a with a bolt 15 inserted into the elongated hole 13a through the spacer 14 such that displacement of the scraper 13 is permitted (see FIG. 6).

Since the scrapers 13 are joined to the conveyor body 12 such that the displacement of the scrapers 13 is permitted, sliding between the scrapers 13 and the bottom surface 10 of the first tank chamber 7 can reliably be performed when the conveyor body 12 has been moved in a direction indicated with an arrow A (see FIG. 3). Thus, sludge, oil and so forth can be discharged to the outside of the other end of the first tank chamber 7 along the inclined surface 10a. Note that a recovery box 16 for recovering discharged sludge, oil and so forth is disposed on the outside of the other end of the first tank chamber 7 at a position at which the other end of the scraper conveyor 11 faces.

The first tank chamber 7 is provided with an oil separating plate 17 for separating oil allowed to float on the liquid level from the working solution which is introduced into the second tank chamber 8 through the communication port 6a.

The oil separating plate 17 is formed into a box-like shape formed such that one side surface and lower surface are opened. The oil separating plate 17 is attached to the partitioning plate 6 in such a manner that the lower end portion of the oil separating plate 17 surrounds the communication port 6a while being immersed under the liquid level.

The second tank chamber 8 is provided with a heating plate 20 disposed at a position opposite to the communication port 6a and structured to heat working solution introduced from the first tank chamber 7.

The heating plate 20 is disposed such that its lower end is positioned apart from the bottom surface of the second tank chamber 8 by substantially 10 cm. Note that this layout enables convections of the introduced working solution to easily occur.

The second tank chamber 8 has corner plates 21 disposed in the four corners to form curved portions in the four corners so as to make smooth the flow of the working solution in the second tank chamber 8. Moreover, the corner plates 21 prevent deposition of sludge in the four corners.

A recess 22a for gathering deposited sludge into one portion is formed in substantially the central portion of the bottom surface 22 of the second tank chamber 8. A drain valve 22b is provided for the lower end of the recess 22a.

A float suction 23 for upwards sucking oil and so forth allowed float on the liquid level of the working solution to return the oil and so forth to the first tank chamber 7 is formed at substantially the central portion of the second tank chamber 8.

The float suction 23 is provided with an oil sucking portion 24 which is capable of sucking oil and so forth allowed to float adjacent to the liquid level of the working solution.

Figure 7:
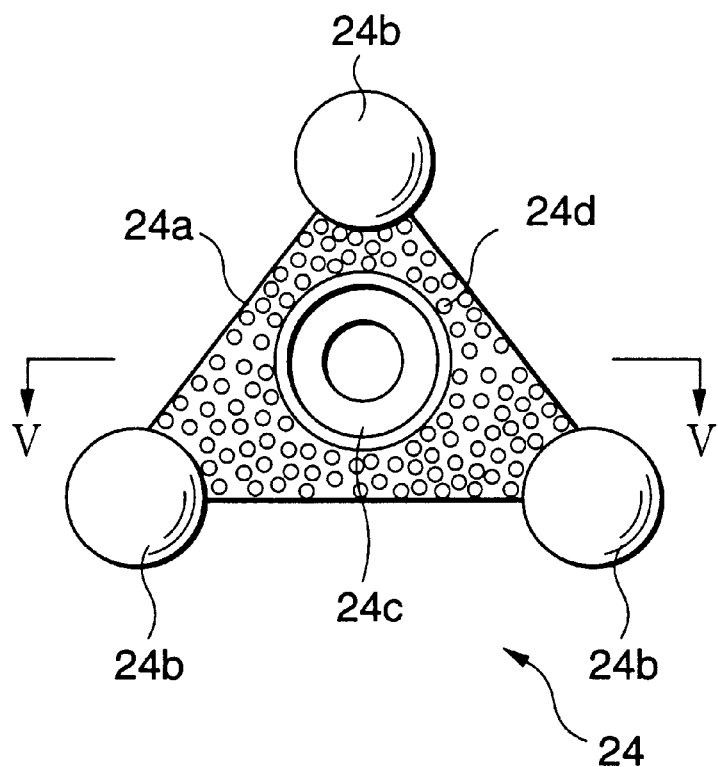
FIG. 7 is an upper view showing a float suction.
Figure 8:
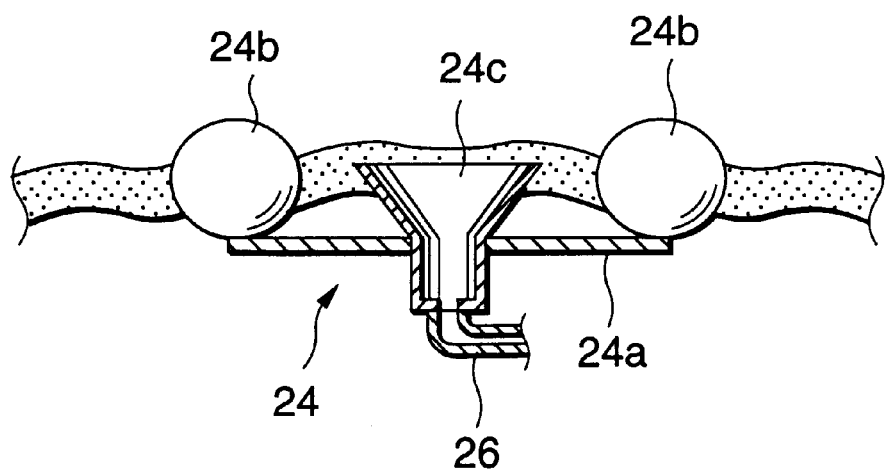
FIG. 8 is a cross sectional view taken along line V—V shown in FIG. 7.
Figure 9:
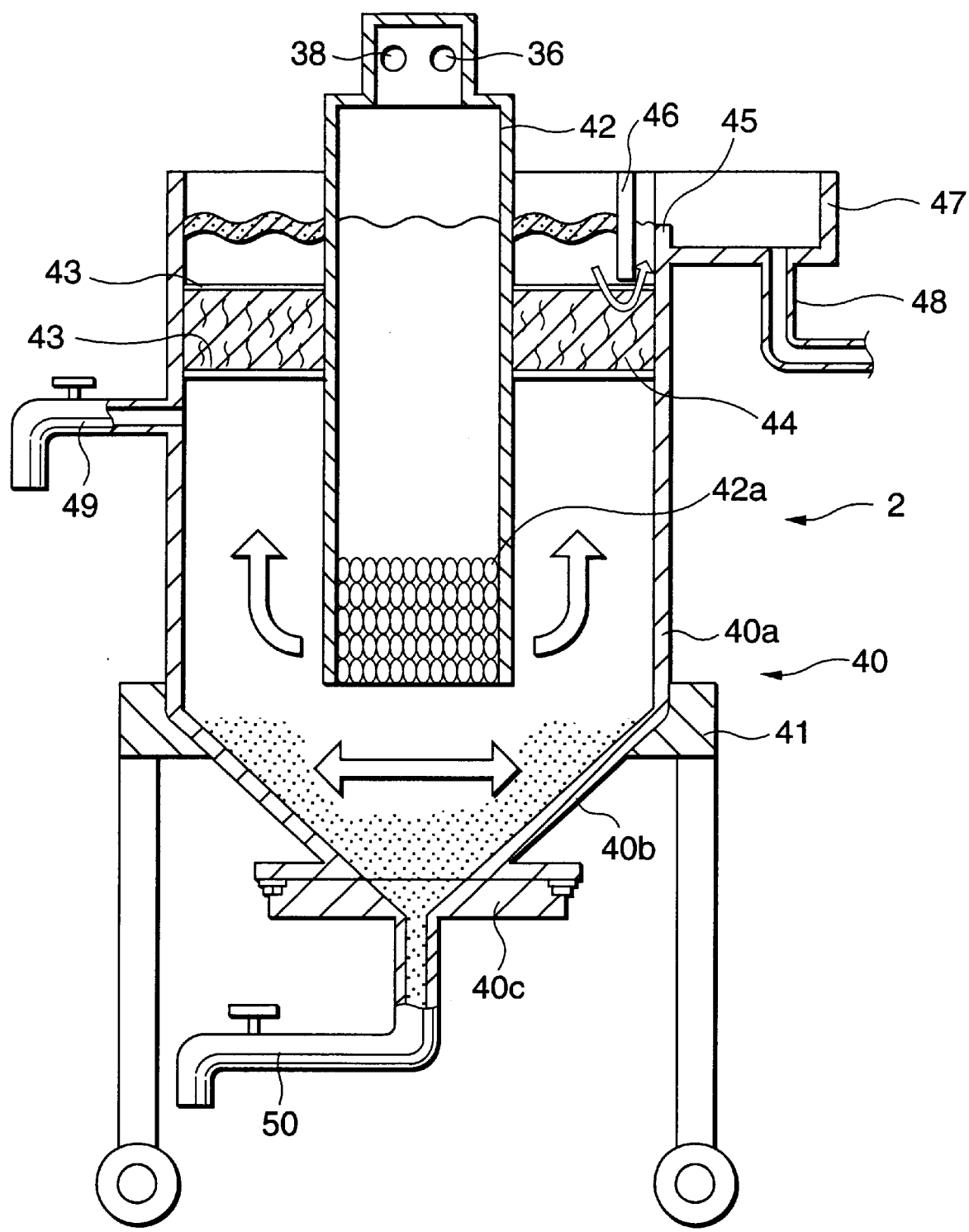
FIG. 9 is a cross sectional view taken along line III—III shown in FIG. 1.

As shown in FIGS. 7 and 8, the oil sucking portion 24 incorporates a plate 24a formed into, for example, a triangle shape and made of stainless steel; floats 24b disposed at three corners of the plate 24a; and an oil sucking port 24c formed in the central portion of the plate 24a.

The oil sucking portion 24 is structured in a floating manner such that the upper end of the oil sucking port 24c is positioned somewhat lower than the liquid level of the working solution. As a result, floating oil on the liquid level is mainly sucked through the oil sucking port 24c.

An oil conduit 26 is connected to the lower end of the oil sucking port 24c. Another end of the oil conduit 26 is opened in the first tank chamber 7. Thus, a pump 25 disposed at an intermediate position of the oil conduit 26 returns oil sucked through the oil sucking port 24c to the first tank chamber 7.

A plurality of through holes 24d for preventing deposition of sludge and so forth on the plate 24a are formed in the plate 24a. As a result, a predetermined buoyancy of the oil sucking portion 24 can be maintained so that a predetermined floating position is maintained.

The second purifying apparatus 2 is movably disposed adjacent to the first purifying apparatus 1.

The second purifying apparatus 2 is connected to the second tank chamber 8 through the solution conduit 29, the first centrifugal separating machine 30 and the second centrifugal separating machine 31.

Specifically, a pump 32 is disposed at an intermediate position of the solution conduit 29, the pump 32 being arranged to upwards suck working solution in the second tank chamber 8 which has been primarily purified.

The first and second centrifugal separating machines 30 and 31 are known machines each having a separating pipe (not shown). Thus, the working solution introduced through the inlet parts 30a and 31a is allowed to pass through the separating pipe in a swirl form. Thus, sludge and so forth contained in the working solution can be separated. The working solution purified in the separating cylinder is discharged through outlet ports 30b and 31b. on the other hand, the working solution containing sludge and so forth is discharged through drain ports 30c and 31c. Note that the first and second centrifugal separating machines 30 and 31 according to this embodiment are Laval Separator (trade name of Nihon Laval Co., Ltd.).

The downstream end of the solution conduit 29 is connected to the inlet port 30a of the first centrifugal separating machine 30.

The outlet port 30b of the first centrifugal separating machine 30 is connected to the inlet port 31a of the second centrifugal separating machine 31 through a solution conduit 35.

On the other hand, the drain port 30c of the first centrifugal separating machine 30 is connected to the second purifying apparatus 2 through the solution conduit 36.

The outlet port 31b of the second centrifugal separating machine 31 is connected to a clean tank 3 through a solution conduit 37.

The drain port 31c of the second centrifugal separating machine 31 is connected to the second purifying apparatus 2 through a solution conduit 38.

That is, the first and second centrifugal separating machines 30 and 31 are connected in series. Thus, clean working solution purified by the first and second centrifugal separating machines 30 and 31 is directly supplied to the clean tank 3. On the other hand, only the working solution containing sludge and so forth is supplied to the second purifying apparatus 2.

A branched pipe 29a for branching the working solution which passes through the solution conduit 29 is disposed at an intermediate position of the downstream of the pump 32 of the solution conduit 29. A downstream portion of the branched pipe 29a faces a position adjacent to the heating plate 20 in the second tank chamber 8. That is, a portion of the working solution sucked by the pump 32 is returned to the inside portion of the second tank chamber 8 by the branched pipe 29a so as to be discharged to a position adjacent to the heating plate 20. The working solution discharged from the branched pipe 29a is, in the second tank chamber 8, circulated around the recess 22a.

The second purifying apparatus 2 incorporates a second working-solution accumulating tank 40 in which the working solution can be accumulated.

The second working-solution accumulating tank 40 incorporates a cylindrical tank body 40a, a tapered bottom surface 40b which is formed integrally with the lower end of the tank body 40a and on which sludge and so forth can be deposited, and a mat hole portion 40c disposed below the bottom surface 40b.

The second working-solution accumulating tank 40 is placed on a carrier car 41 so that the second working-solution accumulating tank 40 is movably disposed adjacent to the first purifying apparatus 1.

A working-solution introducing pipe 42 having a square cross section is erected at substantially the central portion of the second working-solution accumulating tank 40.

The drain ports 30*c* and 31*c* of the first and second centrifugal separating machines 30 and 31 are connected to the upper portion of the working-solution introducing pipe 42 through the solution conduits 36 and 38 so that supply of the working solution is permitted.

A plurality of diffusion holes 42*a* are formed in the lower portion of the working-solution introducing pipe 42 so that working solution supplied to the working-solution introducing pipe 42 is uniformly diffused in the second working-solution accumulating tank 40 from the diffusion holes 42*a*.

A filter holding portion 43 is formed at a position somewhat upwards deviated from the central portion of the tank body 40*a*.

The filter holding portions 43 detachably holds a filter 44. The filter 44 partitions the inside portion of the tank body 40*a*.

The filter 44 is made of a heat insulating and noise reduction material, which is a building material and which is obtained by laminating glass wool having a diameter of about 5 μm by a thickness of about 5 cm.

A stepped portion is formed in the semi-circular-arc portion at an upper end of the tank body 40*a* to serve as a weir 45 for overflowing purified working solution.

Oil separating plates 46 are disposed on the inner surface of the weir 45, the oil separating plates 46 being disposed along the inner surface of the weir 45 at a position apart from each other for predetermined intervals. The upper ends of the oil separating plates 46 are disposed above the weir 45 for a predetermined height. The lower ends of the oil separating plates 46 are immersed in the working solution at positions below the weir 45.

A solution gathering groove 47 for gathering working solution allowed to overflow from the weir 45 is formed on the outer surface of the weir 45. The solution gathering groove 47 is connected to the clean tank 3 though a solution conduit 48.

A drain valve 49 is provided for the second working-solution accumulating tank 40 at a position below the filter 44 of the tank body 40*a*, while a drain valve 50 is provided for the lower end of the mat hole portion 40*c*.

Next, the operation of the purifying system having the above-mentioned structure will now be described.

The working solution introduced into the first tank chamber 7 from the cleaning machine (not shown) through the working-solution supply groove 9 is moderately allowed to flow so that the working solution is diffused in the first tank chamber 7.

The diffusion is performed such that sludge or the like among impurities contained in the working solution and having relatively large particle sizes is deposited on the bottom surface 10 of the first tank chamber 7. On the other hand, oil and so forth are allowed to float on the liquid level of working solution.

At this time, the scraper conveyor 11 has been moved to a direction indicated with an arrow A shown in FIG. 3. Thus, deposited sludge and floating oil components are, by the scrapers 13, upwards scraped along the inclined surface 10*a* of the bottom surface 10 so as to be recovered into the recovery box 16.

Since the curved surface 10*b* is formed at the end of the bottom surface 10 and the scrapers 13 are slid along the curved surface 10*b*, retention of deposited sludge or the like on the bottom surface 10 and resulting corrosion can be prevented.

The working solution diffused in the first tank chamber 7 is introduced into the second tank chamber 8 through the communication port 6*a*. At this time, the working solution is allowed to pass through a position below the oil separating plate 17 and, therefore, the same reaches the communication port 6*a*. Therefore, oil and so forth allowed to float on the liquid level is stopped by the oil separating plate 17.

The working solution introduced into the second tank chamber 8 first collides with the heating plate 20 so that convection is formed and the working solution is heated. Hence, it follows that fine sludge and so forth which are smaller than 10 μm and which have not completely been removed in the first tank chamber 7 are allowed to float on the liquid level. Moreover, oil components and so forth allowed to remain in the working solution are decomposed and allowed to float on the liquid level.

Then, the working solution is, by the working solution discharged from the branched pipe 29*a*, allowed to flow in the second tank chamber 8 around the recess 22*a* at a moderate flow velocity. As a result, deposited sludge and so forth are concentrically accumulated in the recess 22*a* which is the center of the flow. On the other hand, also fine sludge and oil allowed to float on the liquid level are concentrated to a position above the recess 22*a*.

Sludge and so forth deposited in the recess 22*a* are removed by arbitrarily opening the drain valve 22*b*, while floating fine sludge and oil are returned to the first tank chamber 7 by the float suction 23.

Since the corner plates 21 are disposed in the four corners of the second tank chamber 8, the flow of the working solution in the second tank chamber 8 can be made smooth. Moreover, disposition of sludge and so forth in the four corners causing corrosion to occur can be prevented.

The thus-purified working solution is upwards sucked through the solution conduit 29 so as to be introduced into the first centrifugal separating machine 30. Since the working solution which is upwards sucked through the solution conduit 29 has primarily be purified by the first purifying apparatus 1, the foregoing working solution is relatively clean working solution in which sludge, oil and so forth remain in a small quantity.

The first centrifugal separating machine 30 furthermore purifies the working solution to supply the purified working solution to the second centrifugal separating machine 31 through the solution conduit 36. Moreover, working solution containing sludge and so fourth is supplied to the second purifying apparatus 2 through the solution conduit 36.

The second centrifugal separating machine 31 furthermore purifies the working solution to cause the purified clean working solution to be introduced into the clean tank 3 through the solution conduit 37. Moreover, working solution containing sludge and so forth is supplied to the second purifying apparatus 2 through the solution conduit 38.

Note that each of the drain ports 30*c* and 31*c* is provided with a drain valve (not shown) so that adjustment of the degree of opening of foregoing drain ports 30*c* and 31*c* permits the quantity of introduction of the working solution into the second purifying apparatus 2 to be adjusted.

As described above, the first and second centrifugal separating machines 30 and 31 purify the working solution. Therefore, the load of the operation for purifying the working solution which must be done by the second purifying apparatus 2 as described below can be reduced. If the quantity of the working solution which must be subjected to the purifying process is a small quantity, the solution conduit 29 may directly be connected to the second purifying apparatus 2 such that the first and second centrifugal separating machines 30 and 31 are omitted.

When the working solution has been supplied to the working-solution introducing pipe 42 through the solution conduits 36 and 38, the working solution is introduced into a position below the second working-solution accumulating tank 40 through the diffusion holes 42a at a moderate flow velocity so as to uniformly be diffused in all of the direction.

The diffused working solution is allowed to flow to an upper portion of the tank body 40a at a moderate flow velocity. At this time, impurities, such as sludge and so forth, allowed to remain in a small quantity in the working solution is deposited and separated so that the foregoing impurities are deposited on the tapered bottom surface 40b. Then, impurities are submerged along the tapered surface so that impurities are accumulated in the mat hole portion 40c.

Then, the working solution is allowed to flow toward the upper portion of the tank body 40a so that the working solution is allowed to pass through the filter 44. Thus, impurities, such as sludge, allowed to remain in a small quantity without deposition and separation are filtered.

The impurities are captured by the filter 44 in a small quantity. Moreover, the filtration of the working solution is performed upwards. Therefore, the impurities captured by the filter 44 is deposited on the tapered bottom surface 40b when the quantity of the impurities is enlarged to a certain quantity. Therefore, the lifetime required for the filter 44 to be changed can be elongated.

The working solution filtered by the filter 44 is allowed to furthermore upwards flow, and then the working solution overflows owing to the weir 45. Thus, the working solution is introduced into the solution gathering groove 47. Therefore, oil and so forth allowed to somewhat float over the liquid level of the working solution is stopped by the oil separating plates 46. Hence it follows that only clean working solution is introduced into the solution gathering groove 47. The clean working solution is introduced into the clean tank 3 through the solution conduit 48.

Sludge and so forth deposited on the mat hole portion 40c can be removed by arbitrarily opening the drain valve 50. On the other hand, oil and so forth allowed to float on the liquid level of the working solution is arbitrarily removed owing to vacuum air or the like. Note that a drain valve for removing oil and so forth may be provided in a position above the second working-solution accumulating tank 40.

As described above, the second working-solution accumulating tank 40 sequentially serves as the depositing tank, the filtering tank and the oil separating tank in the ascending order so as to purify the working solution.

The working solution accumulated in the clean tank 3 is again supplied to the cleaning machine.

When the second purifying apparatus 2 is cleaned, the drain valve 49 is opened so that the supernatant portion of the working solution is removed. Then, the drain valve 50 is opened to remove the working solution of a type containing sludge and so forth in a large quantity and deposited on the mat hole portion 40c is removed. Then, the mat hole portion 40c is opened to perform cleaning. Note that the supernatant portion of the working solution can be recycled.

The foregoing purifying system is able to perform purifying at a satisfactorily high level so that the working solution changing cycle is elongated to about sixty weeks.

As a result, the number of waste solution disposal operations can be reduced and, therefore, the required quantity of the working solution can be reduced.

Since the quantity of discharge of the waste solution can be reduced, the cost required to dispose the waste solution can be reduced. Moreover, an environmental friendly system can be provided.

Moreover, the number of maintenance steps required to, for example, change the working solution can considerably be reduced.

The recess 22a on which sludge and so forth can be deposited is formed in the bottom surface 22 of the first working-solution accumulating tank 5. Moreover, the drain valve is disposed at the lower end of the recess 22a. Therefore, deposited sludge and so forth can easily be removed.

The tapered bottom surface 40b on which sludge and so forth can be deposited, submerged and accumulated is formed below the working-solution accumulating tank 40. Moreover, the drain valve 50 is disposed at the lower end of the mat hole portion 40c. Therefore, deposited sludge and so forth can easily be removed.

Although this embodiment is structured such that the working solution for use in the cleaning machine is made to be the working solution and the cleaning solution is purified, the working solution which can be purified by the purifying system according to the present invention is not limited to the cleaning solution. For example, grinding solution (coolant) for use in a grinding machine may be purified.

As described above, according to the present invention, the performance for purifying working solution can significantly be improved. Thus, the working solution can repeatedly be used for a long time. Moreover, the running cost and the cost required to dispose the waste solution can be reduced.

What is claimed is:

1. A purifying system for purifying working solution for use in a manufacturing process, said purifying system comprising:
    a first purifying apparatus disposed in a circulating circuit for the working solution for removing impurities mixed in the working solution; and
    a second purifying apparatus disposed downstream of said first purifying apparatus, further purifying the working solution purified by said first purifying apparatus, said second purifying apparatus comprising:
        a working-solution accumulating tank;
        a filter disposed at an intermediate position of said working-solution accumulating tank in such a manner as to vertically section said working-solution accumulating tank;
        a working-solution introducing pipe disposed in substantially a central portion of said working-solution accumulating tank such that said working-solution introducing pipe penetrates said filter, which diffusely discharges the working solution supplied from said first purifying apparatus from a lower end of said working-solution accumulating tank;
        a weir formed at an upper end of said working-solution accumulating tank;
        an oil separating wall formed along an inner surface of said weir and having a lower end which is lower than said weir; and
        a solution gathering groove formed in an outer surface of said weir.

2. A purifying system according to claim 1, wherein the bottom of said working-solution accumulating tank is formed into an inclined surface downwards inclined toward the central portion thereof, and wherein a drain valve discharging impurities deposited at the lower end of said inclined surface is disposed at the central portion.

3. A purifying system according to claim 1, further comprising:
a centrifugal separator disposed between said first purifying apparatus and said second purifying apparatus, for purifying the working solution supplied from said first purifying apparatus, said centrifugal separator supplying separated working solution containing impurities to said second purifying apparatus.

4. A purifying system according to claim 3, wherein said centrifugal separator adjusts the flow rate of the working solution which is supplied from said first purifying apparatus to said second purifying apparatus.

5. A purifying system according to claim 1, wherein said first purifying apparatus comprises:
a first tank chamber; and
a scraper conveyor provided in said first tank chamber, for discharging deposited and floated impurities to the outside of said first tank chamber.

6. A purifying system according to claim 5, wherein said scraper conveyor comprises:
a conveyor body; and
a plurality of scrapers displaceably attached to said conveyor body.

7. A purifying system according to claim 5, wherein said first purifying apparatus comprises:
a second tank chamber formed adjacent to said first tank chamber at a position downstream of said first tank chamber; and
a sucking unit provided in said second tank chambers, for sucking floating impurities, to return sucked impurities to said first tank chamber.

8. A purifying system according to claim 7, wherein said second tank chamber comprises a heating unit for heating the working solution.

9. A purifying system according to claim 7, wherein said second tank chamber comprises:
a circulating unit for circulating the working solution in said second tank chamber; and
corner plates forming curved portions in the corners of said second tank chamber.

10. A purifying system according to claim 7, wherein said second tank chamber comprises:
a recess formed in substantially the central portion of the bottom of said second tank chamber, so as to deposit impurities therein; and
a drain valve disposed at a lower end of said recess.

11. A purifying system for purifying working solution for use in a manufacturing process, said purifying system comprising:
a first purifying apparatus disposed in a circulating circuit for the working solution for removing impurities mixed in the working solution; and
a second purifying apparatus disposed downstream of said first purifying apparatus for further purifying the working solution purified by said first purifying apparatus,
wherein said first purifying apparatus comprises:
a first tank chamber,
a second tank chamber connected to said first tank chamber and said second purifying apparatus for further purifying the working solution purified by said first tank chamber before discharging the working solution to said second purifying apparatus,
a scraper conveyor provided in said first tank chamber for discharging deposited and floated impurities to the outside of said first tank chamber, and
a sucking unit provided in said second chamber for sucking floating impurities to return the impurities to said first tank chamber.

12. A purifying system according to claim 11, wherein said scraper conveyor comprises:
a conveyor body; and
a plurality of scrapers displaceably attached to said conveyor body.

13. A purifying system according to claim 11, wherein said second tank chamber comprises a heating unit heating the working solution.

14. A purifying system according to claim 11, wherein said second tank chamber comprises:
a circulating unit circulating the working solution in said second tank chamber; and
corner plates forming curved portions in the corners of said second tank chamber.

15. A purifying system according to claim 11, wherein said second tank chamber comprises:
a recess formed in substantially the central portion of the bottom of said second tank chamber, so as to deposit impurities therein; and
a drain valve disposed at a lower end of said recess.

16. The purifying system according to claim 11, further comprising: a curved surface provided at the end of the bottom surface of said first tank chamber for sliding said scraper conveyor along thereon so as to prevent retention of deposited sludge on the bottom surface from causing corrosion.

17. The purifying system according to claim 11, further comprising:
an oil separating plate provided between said first tank chamber and said second tank chamber for stopping floating impurities on the liquid level of the working solution from discharging to said second tank chamber from said first tank chamber.

18. A purifying system for purifying working solution for use in a manufacturing process, said purifying system comprising:
a first purifying apparatus disposed in a circulating circuit for the working solution for removing impurities mixed in the working solution; and
a second purifying apparatus disposed downstream of said first purifying apparatus for further purifying the working solution purified by said first purifying apparatus,
wherein said first purifying apparatus comprises:
a first tank chamber for purifying the working solution by discharging deposited and floated impurities outside thereof.
a second tank chamber for further purifying the working solution purified by said first tank chamber;
a circulating unit circulating the working solution in said second tank chamber for circulating the working solution in said second tank chamber so as to concentrate deposited impurities and floating impurities into substantially a central portion of said second tank chamber; and
a discharging unit provided in the central portion of said second tank chamber for discharging at least one of deposited impurities and floating impurities from said second tank chamber.

19. The purifying system according to claim 18, wherein said discharging unit includes a sucking unit provided in said second tank chamber for sucking floating impurities to return the impurities to said first tank chamber.

20. The purifying system according to claim 18, wherein said discharging unit includes a recess formed in the bottom of said second tank chamber so as to deposit impurities therein and a drain valve disposed at a lower end of said recess.

21. The purifying system according to claim 18, wherein said circulating unit circulates the working solution in said second tank chamber by returning a portion of the working solution discharged from said second tank chamber toward said second purifying apparatus to an inside portion of said second tank chamber.

22. The purifying system according to claim 18, wherein said second tank chamber includes corner plates forming curved portions in the corners of said second tank chamber.

* * * * *